(12) United States Patent
Colt (10) Patent No.: US 12,126,694 B2
(45) Date of Patent: *Oct. 22, 2024

(54) STREAM ENGINE USING COMPRESSED BITSETS

(71) Applicant: Jive Software, Inc., Austin, TX (US)

(72) Inventor: Jonathan Colt, Grosse Pointe Woods, MI (US)

(73) Assignee: Jive Software, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/713,938

(22) Filed: Apr. 5, 2022

(65) Prior Publication Data

US 2022/0232088 A1    Jul. 21, 2022

Related U.S. Application Data

(63) Continuation of application No. 14/231,005, filed on Mar. 31, 2014, now Pat. No. 11,323,525.

(51) Int. Cl.
*H04L 67/00* (2022.01)
*G06F 16/22* (2019.01)
*G06F 16/245* (2019.01)
*G06F 16/2455* (2019.01)
*H04L 67/50* (2022.01)

(52) U.S. Cl.
CPC ........ *H04L 67/535* (2022.05); *G06F 16/2237* (2019.01); *G06F 16/24568* (2019.01); *G06F 16/24569* (2019.01)

(58) Field of Classification Search
CPC ........... G06F 16/24568; G06F 16/2237; G06F 16/24569; G06F 16/1744; G06F 11/34; H04L 67/535; H04L 43/00
See application file for complete search history.

(56) References Cited

U.S. PATENT DOCUMENTS

2013/0063288 A1*  3/2013  Bley ................ H04L 69/04
                                                     341/87
2014/0129942 A1*  5/2014  Rathod ............ H04N 21/44226
                                                     715/720

OTHER PUBLICATIONS

Notice of Allowance mailed Jan. 5, 2022, filed in U.S. Appl. No. 14/231,005, pp. 1-6.
Response to Non-Final Office Action dated Sep. 13, 2021, filed in U.S. Appl. No. 14/231,005, pp. 1-11.
Non-Final Office Action mailed May 11, 2021, filed in U.S. Appl. No. 14/231,005, pp. 1-24.
Request for Continued Examination dated Oct. 20, 2020, filed in U.S. Appl. No. 14/231,005, pp. 1-14.
Final Office Action mailed Apr. 20, 2020, filed in U.S. Appl. No. 14/231,005, pp. 1-25.

(Continued)

*Primary Examiner* — Ajay M Bhatia
*Assistant Examiner* — Berhanu Mitiku (57) ABSTRACT

Technologies are described for storing and reporting user activities within a computing environment. For example, bitsets (e.g., compressed and/or uncompressed bitsets) can be used to store activities (e.g., where each activity is a bit in the bitset in chronological order). Separate bitsets can be maintained for followable aspects of the activities (e.g., a separate bitset for each unique followable). Activity streams can be produced from the compressed bitsets (e.g., custom streams reflecting followables designated by users).

14 Claims, 6 Drawing Sheets

(56) References Cited

OTHER PUBLICATIONS

Response to Non-Final Office Action dated Jan. 7, 2020, filed in U.S. Appl. No. 14/231,005, pp. 1-8.
Non-Final Office Action mailed Aug. 7, 2019, filed in U.S. Appl. No. 14/231,005, pp. 1-23.
Request for Continued Examination dated Dec. 13, 2018, filed in U.S. Appl. No. 14/231,005, pp. 1-11.
Advisory Action mailed Dec. 11, 2018, filed in U.S. Appl. No. 14/231,005, pp. 1-5.
Response to Final Office Action dated Nov. 13, 2018, filed in U.S. Appl. No. 14/231,005, pp. 1-10.
Final Office Action mailed Jun. 13, 2018, filed in U.S. Appl. No. 14/231,005, pp. 1-20.
Response to Non-Final Office Action dated Dec. 18, 2017, filed in U.S. Appl. No. 14/231,005, pp. 1-11.
Non-Final Office action mailed Jun. 16, 2017, filed in U.S. Appl. No. 14/231,005, pp. 1-19.

* cited by examiner

STREAM ENGINE USING COMPRESSED BITSETS

BACKGROUND

Traditional search engine solutions provide ways to record user activity. For example, such solutions can maintain indexes of the activities performed within an environment as well as different aspects of the activities. Such solutions can also maintain indexes associating users with various activities. However, maintaining such indexes of activity can be costly in terms of processing power and storage capacity. For example, maintaining associations between users and activities on an individual user basis can require maintaining a complete index for each user.

Therefore, there exists ample opportunity for improvement in technologies related to storing and manipulating records of user activity within a computing environment.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technologies are described for storing and reporting user activities within a computing environment. For example, bitsets (e.g., compressed and/or uncompressed bitsets) can be used to store activities (e.g., where each activity is a bit in the bitset in chronological order). Separate bitsets can be maintained for followable aspects of the activities (e.g., a separate bitset for each unique followable). Activity streams can be produced from the compressed bitsets (e.g., custom streams reflecting followables designated by users).

For example, a method is provided for creating compressed bitsets storing information related streams of user activity. The method comprises monitoring a new activity being performed within a computing environment, obtaining a set of compressed bitsets representing followable aspects of activities being performed within the computing environment, identifying one or more followables associated with the new activity being monitored, and appending bits to the obtained set of compressed bitsets representing the new activity according to the identified followables.

As another example, a method is provided for creating custom streams of activity. The method comprises receiving a query for a custom stream (e.g., from a user) where the query comprises an indication of one or more followables, identifying one or more compressed bitsets, of a set of compressed bitsets, corresponding to the one or more followables, performing the query using the one or more compressed bitsets identified for the custom stream and the one or more followables, and providing a view of the custom stream using results of the query.

As another example, a method is provided for managing inbox streams using compressed bitsets. The method comprises receiving a user request to view an inbox stream of the user, obtaining a compressed bitset representing the inbox stream, identifying followables currently associated with the inbox stream, and appending bits to the compressed bitset representing one or more new activities according to the followables currently associated with the inbox stream.

The technologies described herein can be implemented by a stream engine environment. For example, the stream engine environment can comprise computing devices (e.g., server computers, databases, networking equipment, etc.). The stream engine environment can record user activity that occurs within the environment in compressed bitsets, respond to queries using the compressed bitsets, create custom streams, create inbox streams, and perform other operations related to the compressed bitsets.

The foregoing and other objects, features, and advantages of the invention will become more apparent from the following detailed description, which proceeds with reference to the accompanying figures.

DETAILED DESCRIPTION

The following description is directed to techniques and solutions for storing and reporting user activities within a computing environment. For example, user activities can be managed within a computing environment that provides applications (e.g., social networking applications and/or other types of applications) to the users of the computing environment (e.g., to the users of a business, organization, or other collection of users).

User activities can be stored or recorded using compressed bitsets. In some implementations, a group or set of compressed bitsets is used to store aspects of the activities. For example, a separate compressed bitset can be provided for each unique thing that can be followed (called a followable). The bits of the compressed bitsets can indicate which activities are associated with the followable.

In some implementations, compressed bitsets are created for storing information related to user activities being performed. For example, new activities being performed within a computing environment can be tracked or monitored (e.g., a stream of activities that reflect all the activities being performed within the computing environment in chronological order). The new activities can be added to a set of compressed bitsets representing followable things within the computing environment. For example, followables for the new activites can be determined (e.g., each unique followable in the new activities can be determined). Bits for the new activities can be appended to all of the compressed bitsets in the set. The bit value of an appended bit in a particular compressed bitset depends on whether the activity associated with that bit is associated with the followable of the compressed bitset.

In some implementations, compressed bitsets are queried to create custom streams. For example, a user can create a query indicating followables and query logic (e.g., using AND, OR, NOT, and other query operators). The compressed bitsets for the followables indicated in the query can be identified and the query performed. Results of the query (e.g., activities that match the query) can be presented (e.g., as a view presenting a custom stream of activities).

In some implementations, inbox streams are created and managed using compressed bitsets. An inbox stream (e.g., a special type of custom stream) can record things that a user is following, and the user can change what is being followed at different times. Therefore, the inbox stream can be used to present a record of the activities that match the things that were being followed during different time periods.

A computing environment can maintain compressed bitsets for the followables (e.g., the unique followables) associated with the activities occurring within the environment (e.g., among the users of the environment). For example, an environment may have thousands, tens of thousands, or more compressed bitsets (e.g., a separate bitset for each unique followable). The bitsets can record millions of activities or more (e.g., each bitset can be millions of bits long). Using compressed bitsets can provide for efficient storage and for efficient operations (e.g., by appending bits).

Activities

In the techniques and solutions described herein, activities (also called events) are things that occur within a computing environment (e.g., within a social network environment and/or within other types of computing environments). Activities can represent the result of user action that takes place within the computing environment. Examples of activities include a user creating a document (e.g., a blog post, a word processing document, a tweet, etc.), a user viewing a document (e.g., a user clicking on a document in a file system or on a web page), a user liking a document (e.g., a user clicking on a user interface element associated with the document indicating the user likes the document), a user editing or modifying a document, and a user commenting on a document (e.g., a user adding a comment associated with the document).

Followables

In the techniques and solutions described herein, a followable (also called a followable thing or a followable entity) is something (e.g., an event or activity, or an aspect of an event or activity) that can be followed by a user. For example, a user can follow people (e.g., friends, co-workers, or others), places (e.g., cities, geographical locations, vacation destinations, or other types of places), and/or content (e.g., documents, folders, tweets, blog posts, news stories, articles, digital pictures, video clips, or other types of content).

In some implementations, followables represent things that make up activities, such as: who, what, where, when, and/or why aspects of activities. For example, a particular activity can be associated with a "who" (e.g., the user that performed the activity, such as the user that created a blog post), a "what" (e.g., the type and/or content of the activity, such as a blog post, tweet, picture, video, meeting, etc.), a "where" (e.g., a geographical location such as a city or state, an online location where content is posted, etc.), a "when" (e.g., a time that the activity took place such as when a news article was posted, the time for a meeting, etc.), and/or a "why" (e.g., why the activity occurred, such as to add a comment to a blog posting).

In some implementations, a followable is a consistently identifiable thing (e.g., identified using a unique followable identifier) from which activities can be manipulated (e.g., searched, aggregated, reordered, etc.). For example, a followable can be a particular user. In following the particular user, all of the activities engaged in by the particular user, or otherwise associated with the particular user, can be tracked (e.g., when the user creates a document, comments on a document created by another, is mentioned in a document, etc.).

Stream of Activities

In the techniques and solutions described herein, a stream of activities refers to activities as they occur (e.g., in chronological order) in a computing environment (e.g., within a social networking environment and/or within other computing environments). A stream of activities can be organized in a structure (e.g., an abstract data structure) that stores a sequence of activities in the order they occur (e.g., in a timeline where the activities are ordered according to activity creation time or as activity information is received by a system that creates the stream).

In some implementations, a stream is aggregated to create a condensed view. The aggregation can be performed from a particular point of view (e.g., from the point of view of a particular document, a particular person, etc.). For example, consider a situation in which a document is being interacted with by several people (e.g., several people that are editing the document or commenting on the document). The stream of activities (e.g., document edit activities and document comment activities) could be presented (e.g., displayed) as individual activities in sequence. A condensed view of the stream of activities, however, can present (e.g., display) a condensed or aggregated view of the activities (e.g., an indication of the document with a count of the number of activities that have been performed on the document during a period of time, such as an indication that 10 people have edited or commented on the document in the last hour). As another example, a condensed view can present an indication of the number of changes to a particular group of documents over a period of time (e.g., as a count displayed in association with a folder containing the particular group of documents). As another example, a condensed view can present an indication of the number of activities (e.g., edits, likes, follows, etc.) that have been performed in relation to a particular document (or group of documents) over a period of time.

Compressed Bitsets

In the techniques and solutions described herein, bitsets are used to represent activities. A bitset is an array of bits in which each bit can be on or off. The bits in the bitset can represent activities. For example, each bit position in the bitset can represent a unique activity.

Bitsets can be compressed. For example, a bitset can be compressed using a compression technique. Compression techniques that can be used to compress bitsets include run-length encoding (RLE) and word-aligned hybrid (WAH) compression.

A separate bitset can be maintained for each unique followable. For example, a particular activity may be associated with a number of followables (e.g., if the activity is a blog post creation activity, then the followables can include the user that created the post, the terms mentioned in the post content, the time and/or date of the post, the blog post itself which may be identified by a unique document identifier, etc.). Each unique followable can have its own bitset that tracks which activities are associated with each unique followable.

Using Compressed Bitsets to Record Activities

In the techniques and solutions described herein, compressed bitsets are used to record (store) activities as they occur in a computing environment (e.g., within a social networking environment and/or within other computing environments). For example a compressed bitset can store a sequence of activities in the order they occur (e.g., in a timeline where the activities are ordered according to activity creation time or as activities are received by a system that creates the stream).

Figure 1:
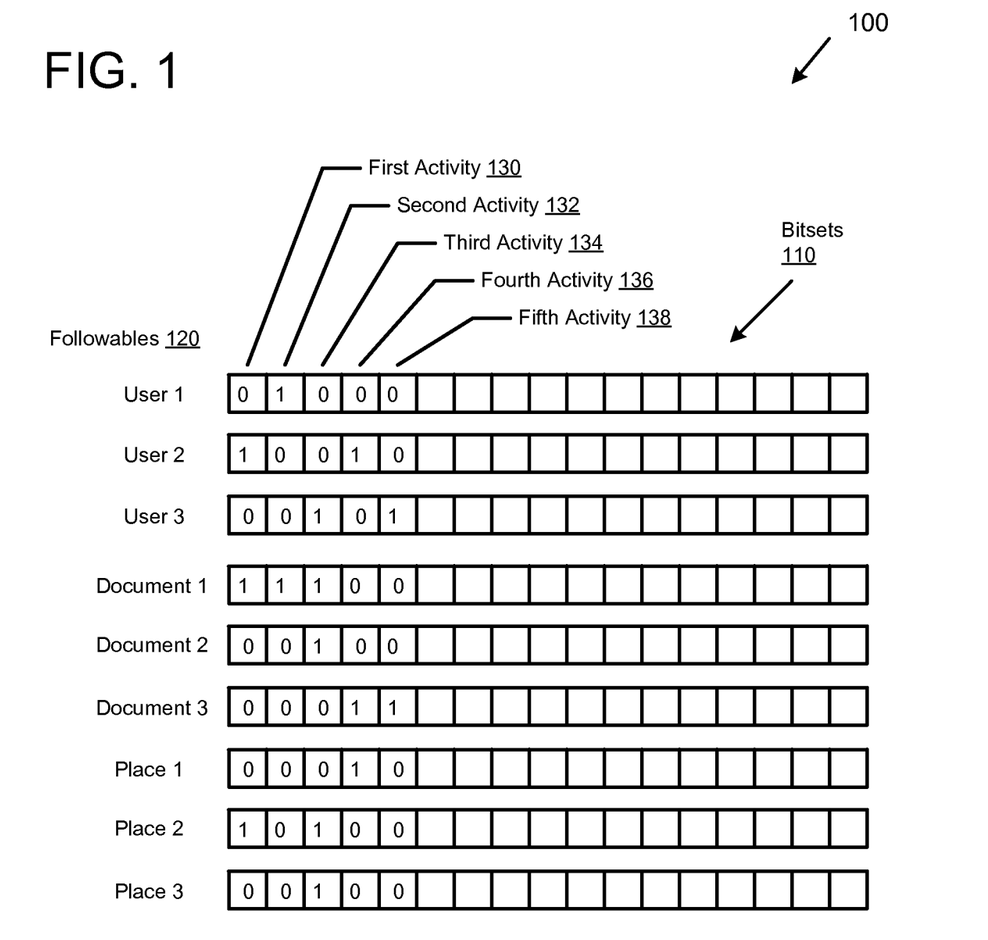
FIG. 1 is a diagram depicting example bitsets recording a number of activities.

FIG. 1 is a diagram depicting a simplified example 100 of how bitsets can be used to store information related to activities and the followables associated with the activities. In the example 100, a number of example followables 120 are depicted along with their associated bitsets 110 (the bitsets 110 are depicted in uncompressed format for ease of discussion). The followables 120 represent unique followable aspects of the activities that have occurred. For example, the followables 120 include three unique users (user 1, user 2, and user 3), three unique documents (e.g., blog posts, news articles, email messages, or other types of documents), and three unique places (e.g., cities, states, or other types of locations).

In the example 100, a number of activities have occurred that have been recorded in the bitsets 110 for the followables 120. Specifically, the example depicts the bitsets 110 after five activities have been recorded (activities 130, 132, 134, 136, and 138). Each bit position in the bitsets 110 refers to a corresponding activity. For example, the first bit position (depicted as the first column in the bitsets 110) corresponds to the first activity 130, and so on.

For example, the first activity 130 can be an activity in which user 2 creates a blog post (identified as document 1) that talks about the weather in Palo Alto, Calif. (identified as place 2). As shown in the bitsets 110, the bits for the followables 120 that are associated with the first activity 130 are set to a specific bit value (in this example, a "1"). Specifically, the first bit position for the user 2 bitset, the document 1 bitset, and the place 2 bitset, is set to "1", while the first bit position for the other bitsets is set to "0".

The second activity 132 can be an activity in which user 2 likes the blog post by user 2 (i.e., likes the first activity 130). As a result, the followables 120 associated with the second activity 132 will be set to a bit value of "1".

The third activity 134 can be an activity in which user 3 posts a comment (indicated as document 2) to the blog post by user 2 comparing the weather of Palo Alto with San Diego (identified as place 3).

The fourth activity 136 can be an activity in which user 2 posts a vacation picture (identified as document 3) taken in Cancun (identified as place 1). The fifth activity 138 can be an activity in which user 3 likes the vacation picture posted by user 2.

Compressed bitsets can be efficient in storing activities as they occur. For example, adding new activities to a compressed bitset can be performed by adding additional bits to the end of the compressed bitset (e.g., by treating each new activity as a new bit added to the end of the compressed bitset). By recording new activities in an "append-only" manner, the new activities can be added to many compressed bitsets efficiently (e.g., without having to uncompress the bitset, modify existing bits, and re-compress). Using an append-only mode for recording activities can be more efficient than a solution that modifies already recorded bits within the compressed bitset, which can require decompressing the compressed bitset, modifying existing bits, and re-compressing the bitset.

Recoding activities by appending bits to compressed bitsets can handle various types of activities. For example, a user can create a blog post, which can be represented as a new activity. The user can modify the blog post, which can be represented as another new activity. The user can even delete the blog post, which can also be represented by another new activity (e.g., in an append mode that does not need to change already recorded bits in the compressed bitstream). In this manner, already recorded activities can be considered immutable.

In some implementations, each instance of a unique followable (e.g., a who, what, where, when, and/or why) has its own compressed bitset. For example, if a user is following events related to the city of Portland, Oreg. (a "where" type of followable), then a compressed bitset would exist for Portland (e.g., identified by a unique key or identifier for the Portland "where" compressed bitset). In the compressed bitset for Portland, a zero (0) can represent an activity that does not include Portland (e.g., an activity that is not associated with the city of Portland, Oreg.) and a one (1) can represent an activity that does include Portland (e.g., an activity that is associated with the city of Portland). Depending on implementation details, the meaning of zero and one for a bit can be reversed. Other compressed bitsets can exist for other unique "where" followables that are associated with the activities being performed and recorded within the computing environment (e.g., compressed bitsets for other cities or other types of locations).

In some implementations, a collection or group of compressed bitsets is maintained. For example, a particular organization (e.g., a business or other collection of people) can be associated with its own collection of compressed bitsets that represent activity performed by the people of the organization or that is associated with the organization. For example, an organization can utilize a computing environment based, at least in part, on a social networking application. Activity engaged in by the organization (the activities engaged in by the users of the organization) can be recorded in compressed bitsets.

Compressed bitsets that represent the same activity have the same number of bits. For example, if activities are being monitored for an organization, then the compressed bitsets representing the activities (e.g., representing the unique followables of the activities) for the organization will all have the same number of bits because each compressed bitset records the same activities.

Creating Custom Streams Using Compressed Bitsets

In the techniques and solutions described herein, custom streams can be created using compressed bitsets. A custom stream refers to a view of activities (e.g., the activities of an organization) using compressed bitsets for a set of followable things. A custom stream can be created by querying or filtering the activities using followables.

A custom stream can be an ad-hoc view of the overall activities (e.g., of the overall activities occurring among a group of people, such as within an organization). An ad-hoc custom stream is a stream that is created "on-the-fly" when needed. For example, a user can decide to create a custom stream (e.g., using a graphical user interface). In order to create the custom stream, the user can designate a set of one or more followable things that define the custom stream. For example, if the user wants to create a custom stream to view activities associated with the user's friends, the user can create a custom stream and designate the user's friends (e.g., select the specific friends using a user interface). The compressed bitsets associated with the user's friends would then be used to obtain the activities associated with the user's friends and the matching activities would be presented to the user (e.g., as a view).

A custom stream can also represent a persistent view of the overall activities. For example, a persistent custom stream can be created by a user so that the user can access a view of a particular set of followables. For example, if the user wants to see any activity that contains the word "Portland" and that is related to the "weather," the user can create a persistent custom stream indicating the two followables. The user can then view the persistent custom stream at any time. In some implementations, the persistent custom stream is updated with any new activities that have occurred since the user last viewed the persistent custom stream (e.g., so that the persistent custom stream does not have to be updated as each new activity is recorded).

Inbox Stream

In the techniques and solutions described herein, an inbox (or inbox stream) is a particular type of custom stream. An inbox stream tracks what was followed and when, and it is specific to a particular user. An inbox stream is different from a custom stream (e.g., an ad-hoc or persistent custom stream) where all activity matching the custom stream (e.g., the custom stream query) is present in the custom stream view when the custom stream is accessed by the user (e.g., without regard to what custom streams the user has viewed in the past). A user can define the followables for an inbox stream (e.g., using a query) and change what is followed (e.g., change the query) from time to time.

For example, consider an inbox stream for a user where the user decides to follow a specific followable for a day (day 1). The next day (day 2), the user decides to stop following the specific followable. The next day (day 3), the user decides to start following the specific followable again in the user's inbox stream. The user's inbox stream would contain activities matching the specific followable that occurred during day 1 and day 3. However, the user's inbox stream would not contain activities matching the specific followable that occurred during day 2 because the user was not following the specific followable during day 2 for the user's inbox stream.

An inbox stream can be provided using a single compressed bitset per inbox stream. For example, if a user has a single inbox stream, the single inbox stream for the user can be represented using a single compressed bitset. The single compressed bitset is the same type of compressed bitset used elsewhere in the environment for tracking user activities. For example, if the user's inbox stream is following activities related to the user's group of friends, then the compressed bitset for the user's inbox stream will have bits turned on for activities related to the user's group of friends during the time the user is following those friends.

In some implementations, a user has a single inbox stream. In other implementations, the user can have one or more inbox streams (e.g., the user can have separate inbox streams and follow different things in the different inbox streams).

An inbox stream can provide for efficient utilization of computing resources (e.g., memory, storage, and processing resources). For example, in some previous solutions a user's inbox is maintained by duplicating multiple bitsets per-user (e.g., duplicating each bitset representing something the user is following or has followed). However, in the inbox stream solution described herein, only a single bitset is maintained for each user's inbox (e.g., in a system where users have one inbox, then one bitset can be maintained for each user).

An inbox stream can also provide for efficient updating of the compressed bitset associated with the inbox stream. For example, the compressed bitset associated with the inbox stream can be updated only when needed (e.g., when the user views the inbox stream and/or when updates are made to what the user is following for the inbox stream). In some implementations, the environment tracks the last time the user looked at the user's inbox and the last time changes were made to what the user is following for the user's inbox. Then, when the user next views the user's inbox stream, the compressed bitset for the user's inbox stream can be updated by appending bits for any new activities that have occurred since the user last viewed the inbox stream and according to what the user is following, while taking into account any changes to the followables. This solution can provide advantages over a solution where each user's inbox stream is checked and updated upon each new activity that occurs in the environment.

In some implementations, inbox streams support read tracking. Read tracking refers to the ability to track activities a user has read (and not read) in the user's inbox stream. In some implementations, read tracking is performed by maintaining an additional compressed bitset that is associated with an inbox stream compressed bitset. The additional compressed bitset tracks whether an activity has been read (e.g., clicked, selected, or otherwise accessed by the user). In some implementations, the additional compressed bitset is called an "inbox unread bitset" which uses a zero bit value to represent activities in the inbox stream that have not been read and a one bit value to represent activities in the inbox stream that have been read. For example, if most activities are typically not read, then the inbox unread bitset can be highly compressible (e.g., mostly zeros). Because the additional compressed bitset used for read tracking needs to be updated when a user reads an entry, the additional compressed bitset does not follow the "append-only" mode of the other compressed bitsets in the environment when recording read activity for activities that have been added to the additional compressed bitset. For example, the additional compressed bitset can be uncompressed, modified (according to activities that have been read), and re-compressed.

Bitsets (e.g., compressed bitsets) can be used to store other types of information. For example, compressed bitsets can be used to maintain permission or authorization information. For example, compressed bitsets can be maintained on a per-user basis and used at query time for permission checks (e.g., indicating which activities the user has permission to view). Compressed bitsets can also be used to store time ranges. For example, bitsets can be created on the fly for searching within time ranges.

Environment for Recording Activities

In the techniques and solutions described herein, a computing environment can be provided for recording activities using compressed bitsets.

Figure 2:
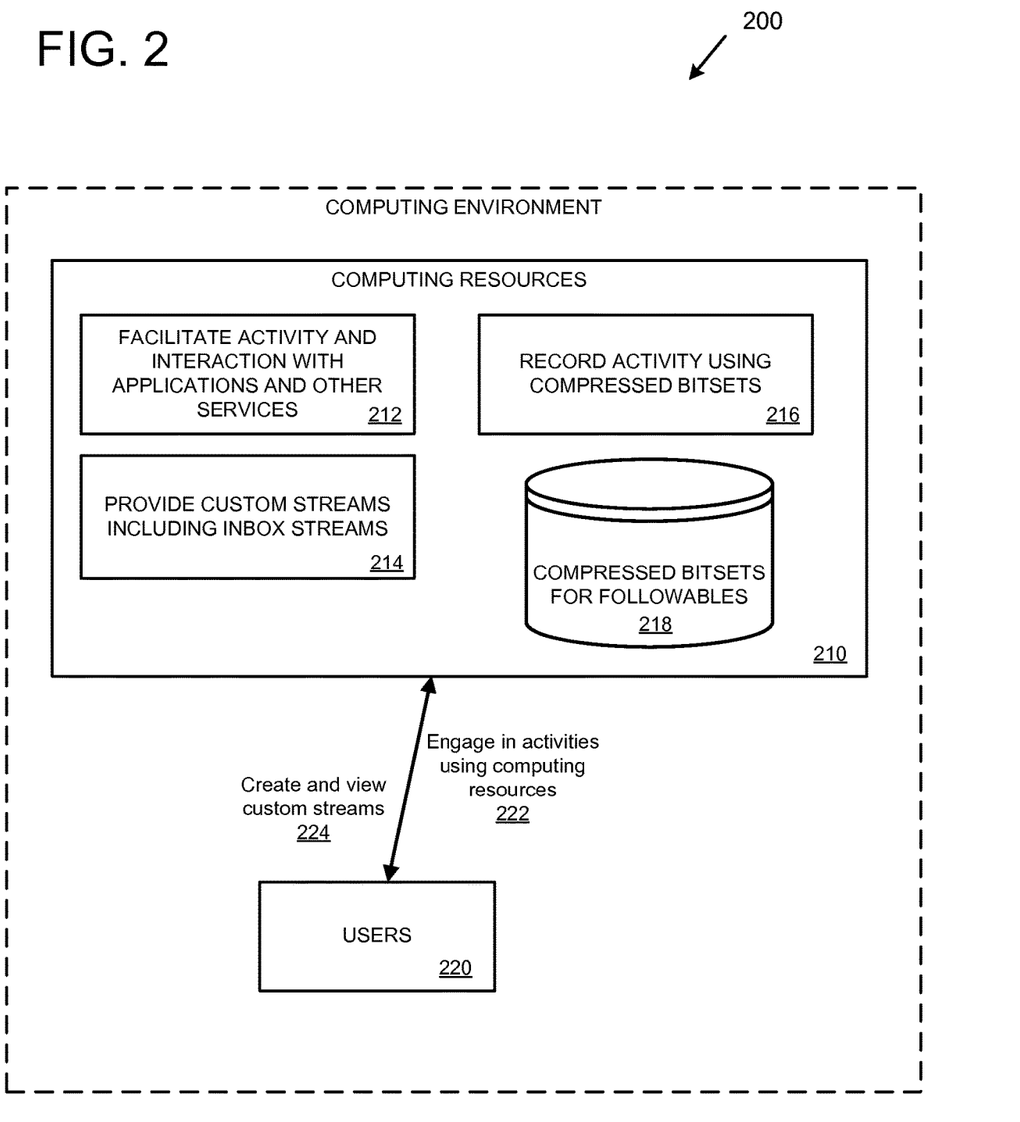
FIG. 2 is a diagram depicting an example computing environment for recording activities using compressed bitsets.

FIG. 2 is a diagram depicting an example computing environment 200 for recording activities using compressed bitsets. The computing environment 200 can comprise various types of computing resources 210, such as server computers, database servers, data stores, application servers, index servers, networking resources, etc. The computing environment 200 can be implemented, for example, as part of a distributed system, a client-server system, and/or a cloud computing environment.

The computing environment 200 provides computing services to users 220 that use the environment. For example, the computing environment 200 can support software applications and other computing services for a group of users (e.g., users 220) within a business or organization. The users 220 can access the computing resources 210 using a variety of client computing devices, such as desktop computers, notebook computers, tablets, smart phones, and other types of computing devices The computing resources 210 facilitate activity and interaction between the users 220 and the applications (e.g., social networking applications and/or other applications) and other services running within the computing environment 200, as depicted at 212. For example, the users 220 can perform activities using the computing resources (e.g., create documents, post comments, send and receive messages, like documents, etc.), as depicted at 222.

The computing resources 210 records activities using compressed bitsets, as depicted at 216. The computing resources 210 can maintain a data store of compressed bitsets 218 for the unique followables associated with the activities being performed within the computing environment 200 (e.g., a separate compressed bitset for each unique followable). When new activities are performed within the computing environment 200 (e.g., when a user creates a document, likes a document, posts a photo or video, etc.), new bits corresponding to the new activities can be appended to the compressed bitsets. The computing resources 210 can implement a stream engine environment.

The computing resources 210 provide custom streams to the users 220, as depicted at 214. For example, the computing resources 210 can receive a request (e.g., comprising a query) from a user to create an ad-hoc or persistent custom stream (e.g., as depicted at 224). The computing resources 210 can compose the custom stream using the appropriate compressed bitsets from the data store of compressed bitsets 218 (e.g., the compressed bitsets for the followables needed to compose the custom stream).

Methods for Managing Activities Using Compressed Bitsets

In the techniques and solutions, methods can be performed for recoding activities using compressed bitsets. For example, new activities can be tracked and new bits added to a set of compressed bitsets to represent the new activities. Methods can also be performed for creating custom streams (e.g., custom activity streams) using compressed bitsets. For example, queries can be received (e.g., indicating query operations in relation to followables) and custom views can be presented from the results. Methods can also be performed for managing inbox streams.

Figure 3:
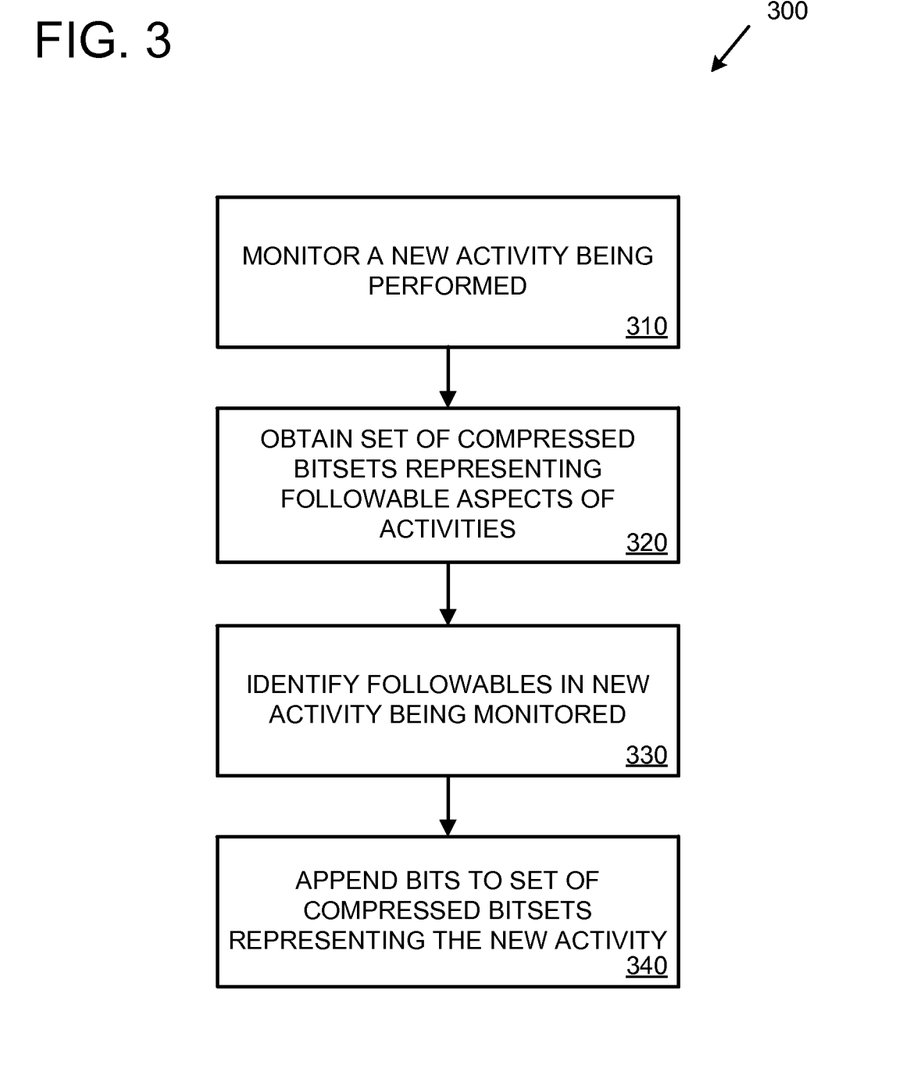
FIG. 3 is a diagram depicting an example flowchart for creating compressed bitsets storing information related to user activity.

FIG. 3 is a flowchart showing an example method 300 for creating compressed bitsets storing information related to user activity. For example, the method 300 can be performed by computing resources, such as computing resources 210.

At 310, a new activity is monitored within a computing environment. For example, the new activity can be an activity performed within the computing environment 200 discussed herein.

At 320, a set of compressed bitsets is obtained. The set of compressed bitsets represents followable aspects of activities performed within the computing environment. For example, a set of compressed bitsets can be maintained corresponding to the unique followables (e.g., all unique followables) that are associated with the activities being performed by users of the computing environment. A separate compressed bitset can be maintained for each unique followable. In some implementations, all compressed bitsets have the same number of bits.

At 330, followables associated with the new activity are identified. The new activity can be associated with one or more followables. For example, if the activity is a user creating a new blog post, then the followables can include a followable for the specific user, a followable for the document (the specific blog post in this example), a followable indicating when the blog post was made (e.g., the date and/or time when the blog post was created), followables for specific words or phrases in the content of the blog post, and/or other followable things associated with the blog post.

At 340, bits are appended to the set of compressed bitsets (obtained at 320). For example, a bit with a first bit value (e.g., a "1") can be added to the compressed bitsets associated with each of the followables identified at 330 and a bit with a second bit value (e.g., a "0") can be added to the other compressed bitsets (i.e., the other compressed bitsets that are associated with followables other than those identified at 330) of the set of compressed bitsets.

Using the example method 300, any number of new activities being performed within a computing environment can be monitored and recorded in the set of compressed bitsets by appending bits according to the followables associated with the new activities.

Figure 4:
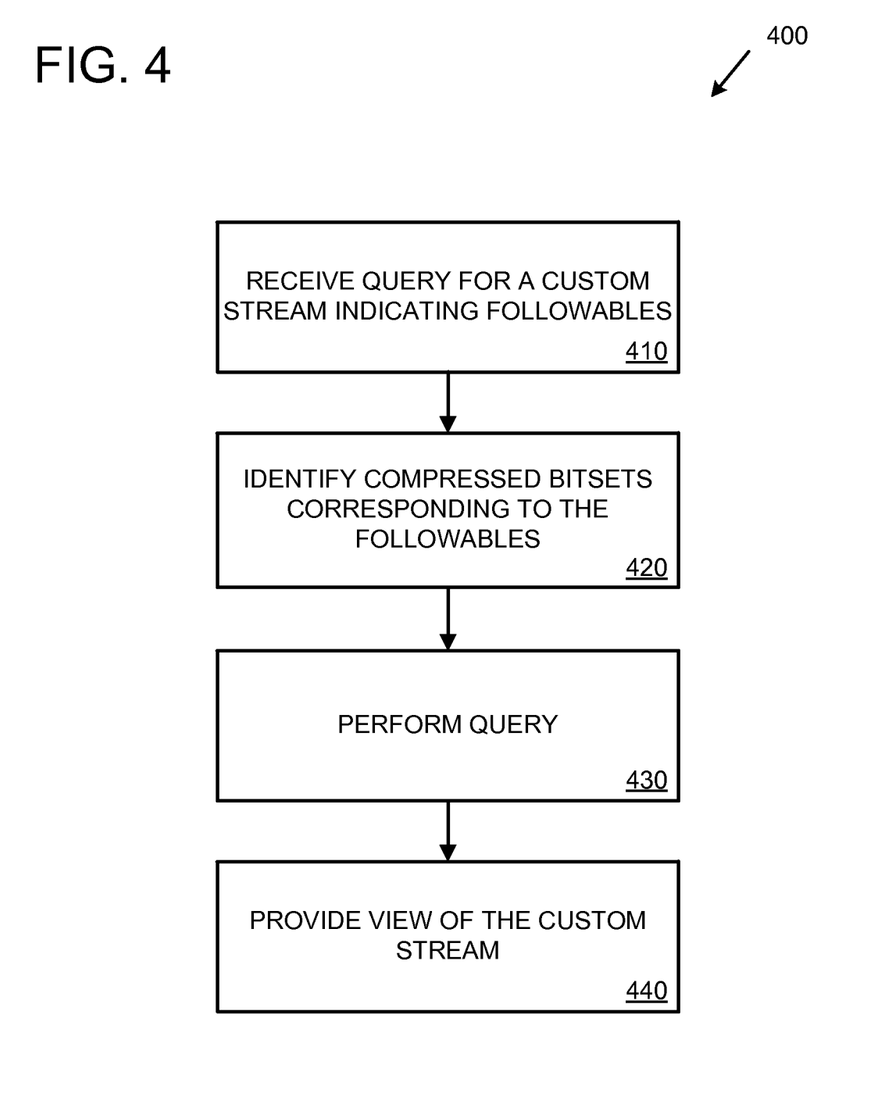
FIG. 4 is a diagram depicting an example flowchart for providing custom streams of activity.

FIG. 4 is a flowchart showing an example method 400 for providing custom streams (e.g., ad-hoc, persistent, or other types of custom streams) of activity. For example, the method 400 can be performed by computing resources, such as computing resources 210.

At 410, a query for a custom stream is received (e.g., from a user). The query indicates which followables are to be selected and how they are to be processed (e.g., using query operators). For example, a query of "Mike AND Portland AND weather" indicates three followables (Mike, Portland, and weather) and indicates that the activity stream is to include activities that include all three followables (as indicated by the "AND" query operators). Queries can be constructed using any number of followables and different query operators (e.g., "AND" operators, "OR" operators, "NOT" operators, etc.).

At 420, the compressed bitsets that correspond to the followables are identified. For example, a computing environment can maintain a set of compressed bitsets for all unique followables. The compressed bitsets for the followables that are needed as part of the query can be identified from within the complete set of compressed bitsets.

At 430, the query is performed using the identified compressed bitsets. For example, the query of "Mike AND Portland AND weather" would return the activities that are associated with all three followables in the query (e.g., each bit position where all three compressed bitsets have a "1" bit value).

At 440, a view of the custom stream is provided (e.g., displayed to the user that requested the custom stream). For example, the custom stream can be provided as a list of matching activities (e.g., in chronological order or in some other order). For example, the query of "Mike AND Portland AND weather" could return activity results such as a blog post by Mike that talks about the current weather in Portland, an email to Mike asking what the current weather is like in Portland, a comment to Mike's blog post that compares the current weather in Portland with San Diego, etc.

Figure 5:
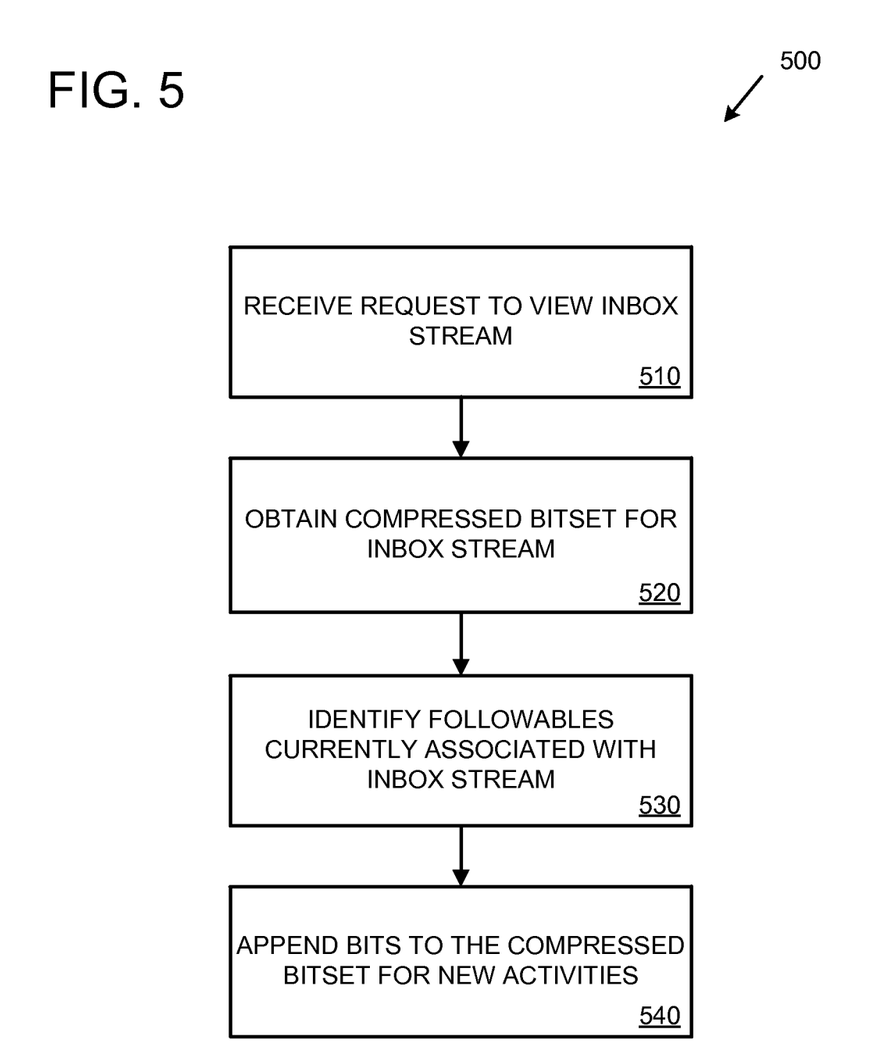
FIG. 5 is a diagram depicting an example flowchart for managing inbox streams using compressed bitsets.

FIG. 5 is a flowchart showing an example method 500 for managing inbox streams using compressed bitsets. For example, the method 500 can be performed by computing resources, such as computing resources 210.

At 510, a request is received (e.g., from a user) to view an inbox stream. The inbox stream can be one of one or more inbox streams associated with a user. At 520, a compressed bitset representing the inbox stream is obtained.

At 530, followables currently associated with the inbox stream are identified. For example, the user can designate one or more followables (e.g., in the format of a query) for the inbox stream. For example, if the user designates two of the user's friends (e.g., Mike and Susan), then the two followables will be associated with the user's inbox stream and the user's inbox stream will track activity associated with the two friends.

At 540, bits are appended to the compressed bitset for new activities. For example, when the user checks the user's inbox (or at another time, such as on a scheduled basis), bits will be appended to the compressed bitset for any new activities that have occurred within the environment since the compressed bitset was last updated (e.g., last viewed by the user). If any of the bits being appended are associated with activities having followables identified at 530, then those bits will be set (e.g., set to a bit value of "1"), while bit values for activities not having followables identified at 530 will have their bit values set accordingly (e.g., set to a bit value of "0").

Example Compressed Bitsets

This section describes an example group of compressed bitsets representing an example set of activities (e.g., some example activities that can occur within a computing environment using a social networking application).

In this example, activities being performed by users are recorded using bitsets. The activities, depicted in Table 1 below, includes the following five activities and their associated followables (followable aspects of the activity) in chronological order:

TABLE 1

Example Activities

| Activity | When | Who | What | Where |
|---|---|---|---|---|
| 1 | Sunday | Mike | The forecast for this week is all rain. | Televised in Portland |
| 2 | Monday | Bob | Another rainy day in Portland. | At home in Portland |
| 3 | Tuesday | Jane | What a beautiful sunset. | Comment on Mike's Hawaii blog |
| 4 | Wednesday | Frank | Need some new all-season tires? | Asked on tire review website |
| 5 | Thursday | Bob | As the rain stopped a rainbow emerged which was then followed by a beautiful sunset. | At home in Portland |

From the activities depicted above, a number of bitsets are produced. The table below (Table 2) depicts an example of some of the bitsets that can be produced (each row with bit values represents a separate bitset).

TABLE 2

Example Bitsets

| Followables | Sunday | Monday | Tuesday | Wednesday | Thursday | Friday |
|---|---|---|---|---|---|---|
| Who | | | | | | |
| Mike | 1 | 0 | 0 | 0 | 0 | 0 |
| Bob | 0 | 1 | 0 | 0 | 0 | 0 |
| Jane | 0 | 0 | 1 | 0 | 0 | 0 |
| Frank | 0 | 0 | 0 | 1 | 0 | 0 |
| Bob | 0 | 0 | 0 | 0 | 1 | 0 |
| What | | | | | | |
| sunset | 0 | 0 | 1 | 0 | 1 | 0 |
| rain | 1 | 1 | 0 | 0 | 1 | 0 |
| ... | | | | | | |
| Where | | | | | | |
| Portland | 1 | 1 | 0 | 0 | 1 | 0 |
| Hawaii | 0 | 0 | 1 | 0 | 0 | 0 |
| ... | | | | | | |

As depicted in Table 2 above, the bitset for Mike (a "who" type of followable) includes a bit for each of the five example activities depicted in Table 1. In this example, Mike is only associated with the first activity (activity 1) that occurred on Sunday, and therefore the first bit is a "1" while the remaining bits are "0". Similarly, the bitset for "sunset" (a "what" type of followable) includes a bit for each of the five example activities depicted in Table 1. In this example, a "sunset" is mentioned in two activities (activity 3 and activity 5) and therefore these bits are set to "1" while the bits for activities that do not mention a "sunset" are set to "0". As depicted in Table 2, each of the bitsets has the same number of bits (a bit for each of the activities in the set of activities being recorded).

The example bitsets depicted in Table 2 above can be compressed (e.g., stored as compressed bitsets). Table 3 below illustrates a simplified example of compressing the bitsets using run-length encoding. In general, using run-length encoding, runs of ones and zeros can be represented in a more efficient format by indicating the number of consecutive ones and zeros.

TABLE 3

Example Compressed Bitsets

| Followables | |
|---|---|
| Who | |
| Mike | 1, run of 5 zeros |
| Bob | 0, 1, run of 4 zeros |
| Jane | run of 2 zeros, 1, run of 3 zeros |
| Frank | run of 3 zeros, 1, run of 2 zeros |
| Bob | run of 4 zeros, 1, 0 |
| What | |
| sunset | run of 2 zeros, 1, 0, 1, 0 |
| rain | run of 2 ones, run of 2 zeros, 1, 0 |
| . . . | |
| Where | |
| Portland | run of 2 ones, run of 2 zeros, 1, 0 |
| Hawaii | run of 2 zeros, 1, run of 3 zeros |
| . . . | |

Using compressed bitsets to represent followables, different combinations of followables can be monitored. For example, user Jane can follow Frank and Mike (e.g., a query for "Frank OR Mike"). The compressed bitsets for Frank and Mike are depicted below in Table 4.

TABLE 4

Bitsets for Mike and Frank

| Followables | Sunday | Monday | Tuesday | Wednesday | Thursday | Friday |
|---|---|---|---|---|---|---|
| Mike | 1 | 0 | 0 | 0 | 0 | 0 |
| Frank | 0 | 0 | 0 | 1 | 0 | 0 |

In order to follow the activities associated with Frank and Mike, the two bitsets depicted above in Table 4 can be compared (or queried) using an "or" operation to obtain a list of activities associated with Mike, Frank, or both Mike and Frank. By performing an "or" on the two bitsets, the activity stream being followed by Jane (following activities of Frank and Mike) would result in the following activity stream (below is a simplified representation of the activity stream, which can be represented in different formats such as a list of activities in a graphical user interface, an list of activities in a digital inbox, or in another format):

Activity 1—Sunday, Mike, The forecast for this week is all rain, Televised in Portland.

Activity 2—Thursday, Frank, Need some new all-season tires? Asked on tire review site.

In some implementations, individualized streams (also called inbox streams) are created to represent what particular users are following and when. For example, user Jane can follow particular things (e.g., specific people, places, and/or other types of followables). User Jane can change what is being followed from time to time. Table 5 below depicts an example in which user Jane is following "Portand OR sunset" and Jane checks her individualized stream on Monday. As a result, Jane's individualized stream (represented by a new compressed bitset "Jane's individualized stream") would include activities 1 and 2 (which match the Portland followable).

TABLE 5

Individualized Stream for Monday

| Followables | Sunday | Monday |
|---|---|---|
| Portland | 1 | 1 |
| sunset | 0 | 0 |
| Jane's individualized stream | 1 | 1 |

Continuing the example, Jane checks her individualized stream on Thursday, which causes activities since Jane last checked her individualized stream on Monday to be added to Jane's individualized stream compressed bitset as depicted in Table 6 below (the bold "1", "0", and "1" for Tuesday, Wednesday, and Thursday).

TABLE 6

Individualized Stream for Thursday

| Followables | Sunday | Monday | Tuesday | Wednesday | Thursday |
|---|---|---|---|---|---|
| Portland | 1 | 1 | 0 | 0 | 1 |
| sunset | 0 | 0 | 1 | 0 | 1 |
| Jane's individualized stream | 1 | 1 | 1 | 0 | 1 |

Continuing the example, on Friday Jane decides to add user Frank to the followables for her individualized stream (e.g., the query could be "Frank OR Portland Oreg. sunset"), which causes activities since Jane last checked her individualized stream on Thursday to be added to Jane's individualized stream compressed bitset as depicted in Table 7 below. As depicted in Table 7, one bit is added to the individualized stream compressed bitset for Friday (a "0"). Also, as depicted in Table 7, the individualized stream compressed bitset value for Wednesday does not change even though followable Frank is associated with an activity on Wednesday. The value for Wednesday does not change because Jane was not following Frank on Wednesday (she only started following Frank on Friday) so the previous bit values of her individualized compressed bitstream do not change.

TABLE 7

Individualized Stream for Friday

| Followables | Sunday | Monday | Tuesday | Wednesday | Thursday | Friday |
|---|---|---|---|---|---|---|
| Portland | 1 | 1 | 0 | 0 | 1 | 0 |
| sunset | 0 | 0 | 1 | 0 | 1 | 0 |
| Frank | 0 | 0 | 0 | 1 | 0 | 0 |
| Jane's individualized stream | 1 | 1 | 1 | 0 | 1 | 0 |

Example Computing Devices

The techniques and solutions described herein can be performed by software and/or hardware of a computing environment, such as a computing device. For example, computing devices include server computers, desktop computers, laptop computers, notebook computers, netbooks, tablet devices, mobile devices, and other types of computing devices. The techniques and solutions described herein can be performed in a cloud computing environment (e.g., comprising virtual machines and underlying infrastructure resources).

Figure 6:
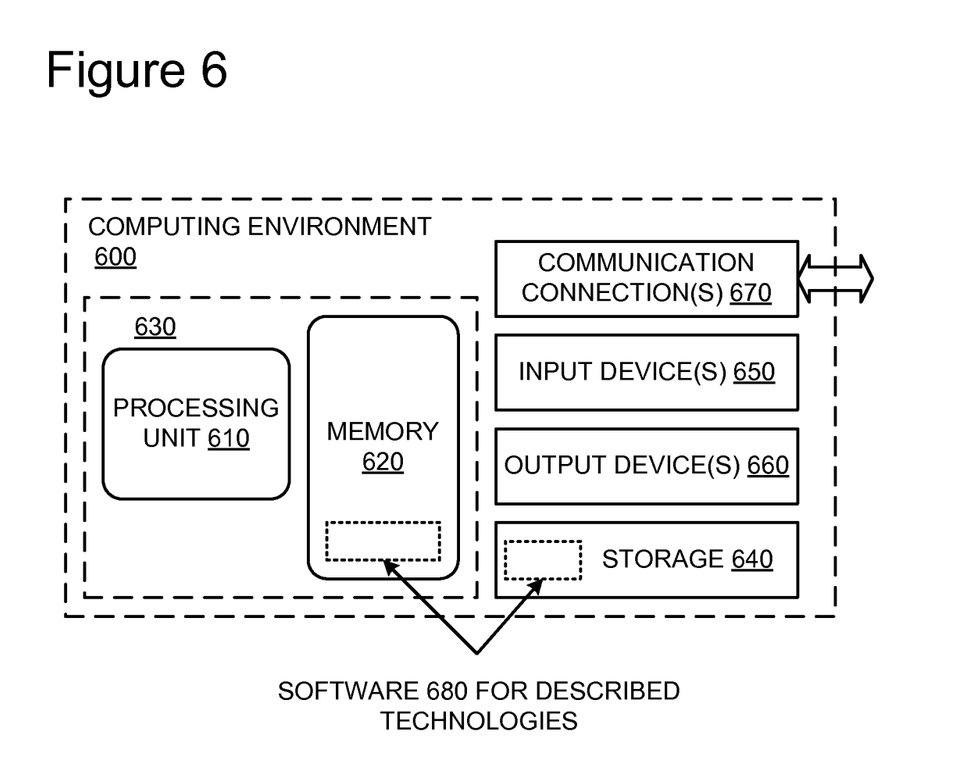
FIG. 6 is a block diagram illustrating an example computing device in conjunction with which techniques and tools described herein may be implemented.

FIG. 6 illustrates a generalized example of a suitable computing environment 600 in which described embodiments, techniques, and technologies may be implemented. The computing environment 600 is not intended to suggest any limitation as to scope of use or functionality of the technology, as the technology may be implemented in diverse general-purpose or special-purpose computing environments. For example, the disclosed technology may be implemented using a computing device (e.g., a server, desktop, laptop, hand-held device, mobile device, PDA, etc.) comprising a processing unit, memory, and storage storing computer-executable instructions implementing the technologies described herein. The disclosed technology may also be implemented with other computer system configurations, including hand held devices, multiprocessor systems, microprocessor-based or programmable consumer electronics, network PCs, minicomputers, mainframe computers, a collection of client/server systems, and the like. The disclosed technology may also be practiced in distributed computing environments where tasks are performed by remote processing devices that are linked through a communications network. In a distributed computing environment, program modules may be located in both local and remote memory storage devices.

With reference to FIG. 6, the computing environment 600 includes at least one central processing unit 610 and memory 620. In FIG. 6, this most basic configuration 630 is included within a dashed line. The central processing unit 610 executes computer-executable instructions. In a multi-processing system, multiple processing units execute computer-executable instructions to increase processing power and as such, multiple processors can be running simultaneously. The memory 620 may be volatile memory (e.g., registers, cache, RAM), non-volatile memory (e.g., ROM, EEPROM, flash memory, etc.), or some combination of the two. The memory 620 stores software 680 that can, for example, implement the technologies described herein. A computing environment may have additional features. For example, the computing environment 600 includes storage 640, one or more input devices 650, one or more output devices 660, and one or more communication connections 670. An interconnection mechanism (not shown) such as a bus, a controller, or a network, interconnects the components of the computing environment 600. Typically, operating system software (not shown) provides an operating environment for other software executing in the computing environment 600, and coordinates activities of the components of the computing environment 600.

The tangible storage 640 may be removable or non-removable, and includes magnetic disks, magnetic tapes or cassettes, CD-ROMs, DVDs, or any other medium which can be used to store information and which can be accessed within the computing system 600. The storage 640 stores instructions for the software 680, which can implement technologies described herein.

The input device(s) 650 may be a touch input device, such as a keyboard, keypad, mouse, pen, or trackball, a voice input device, a scanning device, or another device, that provides input to the computing environment 600. For audio, the input device(s) 650 may be a sound card or similar device that accepts audio input in analog or digital form, or a CD-ROM reader that provides audio samples to the computing environment 600. The output device(s) 660 may be a display, printer, speaker, CD-writer, or another device that provides output from the computing environment 600.

The communication connection(s) 670 enable communication over a communication medium (e.g., a connecting network) to another computing entity. The communication medium conveys information such as computer-executable instructions, compressed graphics information, or other data in a modulated data signal.

Alternatives and Variations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 6, computer-readable storage media include memory 620 and/or storage 640. The term computer-readable storage media does not include signals and carrier waves. In addition, the term computer-readable storage media does not include communication connections (e.g., 670).

Any of the computer-executable instructions for implementing the disclosed techniques as well as any data created and used during implementation of the disclosed embodiments can be stored on one or more computer-readable storage media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

The disclosed methods, apparatus, and systems should not be construed as limiting in any way. Instead, the present disclosure is directed toward all novel and non-obvious features and aspects of the various disclosed embodiments, alone and in various combinations and sub-combinations with one another. The disclosed methods, devices, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, implemented at least in part by a computing device, for creating compressed bitsets storing information related to user activity, the method comprising:
    executing code by one more processors to cause the computing device to perform operations comprising:
    monitoring a new activity being performed within a computing environment;
    obtaining a set of compressed bitsets, wherein the set of compressed bitsets represents followable aspects of activities being performed within the computing environment, wherein each followable is represented by a unique one of the bitsets and each of the activities is represented by at least one bit location and at least one bit value in each of the bitsets;
    identifying one or more followables associated with the new activity being monitored; and
    appending one or more bits to the obtained set of compressed bitsets to generate a revised set of compressed bitsets, wherein the one or more bits appended are bits that represent the new activity according to the identified followables.

2. The method of claim 1, wherein identifying the followables associated with the new activity comprises:
    identifying one or more of who, what, when, where, and why followables are associated with the new activity.

3. The method of claim 1, wherein the set of compressed bitsets comprises a compressed bitset for each unique followable associated with the activities being performed by users within the computing environment.

4. The method of claim 1, wherein each compressed bitset, of the set of compressed bitsets, has the same number of bits.

5. The method of claim 4, wherein:
    creating a document comprises one or more of:
    creating a blog post, a word processing document, and a tweet;
    viewing a document comprises one or more of:
    clicking on a document in a file system and on a web page;
    the user liking a document comprises one or more of:
    the user clicking on a user interface element associated with the document indicating the user likes the document; and
    the user commenting comprises the user adding a comment associated with the document.

6. The method of claim 4, wherein the followable is a consistently identifiable thing from which the activities can be manipulated.

7. The method of claim 1, wherein each compressed bitset, of the set of compressed bitsets, is compressed using run-length encoding.

8. The method of claim 1, wherein the appending bits to the obtained set of compressed bitsets comprises appending a bit value to each compressed bitset for the new activity.

9. The method of claim 1, wherein the appending bits to the obtained set of compressed bitsets comprises:
    for each compressed bitset, appending one bit:
    when the compressed bitset is associated with a followable that is one of the identified followable, setting the one bit to a first bit value indicating the followable is one of the identified followables; and
    when the compressed bitset is associated with a followable that is not one of the identified followables, setting the one bit to a second bit value, different from the first bit value, indicating the followable is not one of the identified followables.

10. The method of claim 9, wherein the first bit value is a one, and wherein the second bit value is a zero.

11. The method of claim 1, wherein executing code by the one more processors cause the computing device to perform further operations comprising:
    monitoring one or more additional new activities being performed within the computing environment; and
    performing the obtaining, the identifying, and the appending for the one or more additional new activities being performed.

12. The method of claim 1, wherein executing code by the one more processors cause the computing device to perform further operations comprising:
    creating a custom stream, wherein creating a custom stream comprises:
    receiving a custom stream request comprising one or more followables for the custom stream;
    identifying one or more compressed bitsets, of the set of compressed bitsets, corresponding to the one or more followables for the custom stream; and
    using the one or more compressed bitsets identified for the custom stream, composing a view that presents activities common to the one or more compressed bitsets for the custom stream.

13. The method of claim 1, wherein each compressed bitset, of the set of compressed bitsets, contains a sequence of bits, and wherein each bit, of the sequence of bits, is associated with a different activity.

14. The method of claim 1, wherein the activities comprise one or more of:
    a user of the computing environment creating a document;
    the user viewing a document;
    a user liking a document;
    a user editing a document;
    a user modifying a document; and
    a user commenting on a document.

* * * * *